United States Patent
Ulrich et al.

(10) Patent No.: US 9,610,596 B2
(45) Date of Patent: Apr. 4, 2017

(54) ALTERNATOR FOR ELECTROSTATIC SPRAY GUN

(71) Applicant: Graco Minnesota Inc., Minneapolis, MN (US)

(72) Inventors: Mark E. Ulrich, Oak Grove, MN (US); Jason J. Willoughby, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/432,656

(22) PCT Filed: Sep. 30, 2013

(86) PCT No.: PCT/US2013/062656
§ 371 (c)(1),
(2) Date: Mar. 31, 2015

(87) PCT Pub. No.: WO2014/055422
PCT Pub. Date: Apr. 10, 2014

(65) Prior Publication Data
US 2015/0266039 A1    Sep. 24, 2015

Related U.S. Application Data

(60) Provisional application No. 61/708,145, filed on Oct. 1, 2012.

(51) Int. Cl.
*H02K 5/00* (2006.01)
*B05B 5/053* (2006.01)
(Continued)

(52) U.S. Cl.
CPC ............ *B05B 5/0532* (2013.01); *F01D 15/10* (2013.01); *H02K 1/02* (2013.01); *H02K 5/10* (2013.01);
(Continued)

(58) Field of Classification Search
CPC ........................................................ H02K 5/10
(Continued)

(56) References Cited

U.S. PATENT DOCUMENTS 4,219,865 A    8/1980  Malcolm
4,290,091 A    9/1981  Malcolm
(Continued)

FOREIGN PATENT DOCUMENTS

CN    101970122 A    2/2011
GB       1597349         9/1981
KR    20110089287 A   8/2011

OTHER PUBLICATIONS

First Chinese Office Action, for Chinese Patent Application No. 201380051282.1, dated Jun. 23, 2016, 20 pages.
(Continued)

*Primary Examiner* — Hanh Nguyen
(74) *Attorney, Agent, or Firm* — Kinney & Lange, P.A.

(57) ABSTRACT

An alternator, such as for use in an electrostatic spray gun, comprises an alternator housing, a stator, a rotor, a shaft, a first bearing and a sheath. The stator is inserted into the alternator housing and has an inner diameter and an outer diameter. The rotor is disposed within the inner diameter of the stator. The shaft extends from the rotor and is rotatably supported by a first bearing. The sheath surrounds the outer diameter, supports the stator with respect to the alternator housing, and supports the bearing.

17 Claims, 6 Drawing Sheets

(51) Int. Cl.
*F01D 15/10* (2006.01)
*H02K 1/02* (2006.01)
*H02K 5/10* (2006.01)
*H02K 5/16* (2006.01)
*B05B 13/02* (2006.01)
*B05B 5/08* (2006.01)

(52) U.S. Cl.
CPC .............. *H02K 5/161* (2013.01); *B05B 5/082* (2013.01); *B05B 13/0264* (2013.01)

(58) Field of Classification Search
USPC ........................................ 310/89, 90, 91, 43
See application file for complete search history.

(56) References Cited

U.S. PATENT DOCUMENTS

| | | | |
|---|---|---|---|
| 4,377,838 | A | 3/1983 | Levey et al. |
| 4,462,061 | A | 7/1984 | Mommsen |
| 4,777,397 | A | 10/1988 | Parshall |
| 5,491,602 | A | 2/1996 | Horn et al. |
| 5,747,909 | A | 5/1998 | Syverson et al. |
| 6,522,039 | B1 | 2/2003 | Baltz et al. |
| 6,885,114 | B2 | 4/2005 | Baarman et al. |
| 7,471,000 | B1 | 12/2008 | Ruiz |
| 7,847,449 | B2 * | 12/2010 | Oberle ................. H02K 7/1166 310/154.08 |
| 7,926,748 | B2 | 4/2011 | Altenburger |
| 8,016,213 | B2 | 9/2011 | Altenburger |
| 2004/0195403 | A1 | 10/2004 | Atterbury et al. |
| 2004/0195404 | A1 | 10/2004 | Lunzer |
| 2006/0065760 | A1 | 3/2006 | Micheli |
| 2008/0012239 | A1 * | 1/2008 | Corbett, Jr. ........... E21D 11/385 277/592 |
| 2009/0121569 | A1 * | 5/2009 | Spaggiari ............... H02K 15/14 310/89 |
| 2010/0231068 | A1 | 9/2010 | Yamazaki et al. |
| 2011/0133582 | A1 * | 6/2011 | Bingler .................. F04B 17/03 310/71 |
| 2011/0210190 | A1 | 9/2011 | Yang |
| 2012/0212092 | A1 | 8/2012 | Goto et al. |

OTHER PUBLICATIONS

International Searching Authority, International Search Report and Written Opinion, Jan. 21, 2014, 11 pages.

Extended European Search Report, for EP Patent No. 13843658.9, dated May 3, 2016, 6 pages.

Taiwanese Office Action, for Taiwanese Patent Application No. 102135752, dated Dec. 23, 2016, 9 pages.

* cited by examiner

ALTERNATOR FOR ELECTROSTATIC SPRAY GUN

CROSS-REFERENCE TO RELATED APPLICATION(S)

This application claims benefit to International Application No. PCT/US2013/062656filed September, 2013 entitled "ALTERNATOR FOR ELECTROSTATIC SPRAY GUN" and claims benefit of Provisional Application No. 61/708,145, filed Oct. 1, 2012 entitled "AIR DRIVEN ALTERNATOR", which are incorporated herein.

BACKGROUND

The present invention relates generally to applicators that are used to spray fluids, such as paint, sealants, coatings, enamels, adhesives, powders and the like. More particularly, the invention relates to electrostatic spray guns.

In electrostatic spray systems, an electrostatic field is produced in the vicinity between the spray gun and the target or article to be sprayed. The sprayed particles are propagated through this field, and the respective particles pick up electrical charges as they pass through the field. The charged particles are thereby attracted to the article to be sprayed. By this process, it is possible to direct a much higher percentage of sprayed particles to the actual article to be sprayed, and thereby the efficiency of spraying is vastly improved over conventional methods. Electrostatic spray guns are particularly useful for applying non-conductive liquids and powders, although they may be used in connection with spraying conductive liquids.

In a typical electrostatic spraying system, an ionizing electrode is placed in the vicinity of the spray gun spray orifice, the article to be painted is held at ground potential, and an electrostatic field is developed between the ionizing electrode and the article. The distance between the electrode and ground may be on the order of about 0.5 meters or less; therefore, the voltage applied to the spray gun electrode must necessarily be quite high in order to develop an electrostatic field of sufficient intensity to create a large number of ion/particle interactions so as to develop a sufficient attractive force between the paint particles and the target. It is not unusual to apply electrostatic voltages on the order of 20,000-100,000 volts (20-100 kV) to the spray gun electrode in order to achieve a proper degree of efficiency in the spraying operation. An ionizing current on the order of 50 micro-amps typically flows from the spray gun electrode.

Electrostatic spray guns may be hand-held spray guns or automatic spray guns operable by remote control connections. The sprayed fluid may be atomized using different primary atomizing forces, such as pressurized air, hydraulic forces, or centrifugal forces. Power for the electrostatic voltage may be generated in a variety of ways. In many systems, an external power source is connected to the electrostatic spray gun. However, in other designs, power may be generated with an alternator located in the electrostatic spray gun. For example, U.S. Pat. Nos. 4,554,622, 4,462,061, 4,290,091, 4,377,838, 4,491,276 and 7,226,004 describe electrostatic spray guns having an air-powered turbine which drives an alternator that in turn supplies a voltage multiplier to provide the charging voltage.

SUMMARY

In one embodiment, an alternator, such as for use in an electrostatic spray gun, comprises an alternator housing, a stator, a rotor, a shaft, a first bearing and a sheath. The stator is inserted into the alternator housing and has an inner diameter and an outer diameter. The rotor is disposed within the inner diameter of the stator. The shaft extends from the rotor and is rotatably supported by a first bearing. The sheath surrounds the outer diameter of the stator, supporting the stator with respect to the alternator housing, and supports the first bearing.

DETAILED DESCRIPTION

Figure 1:
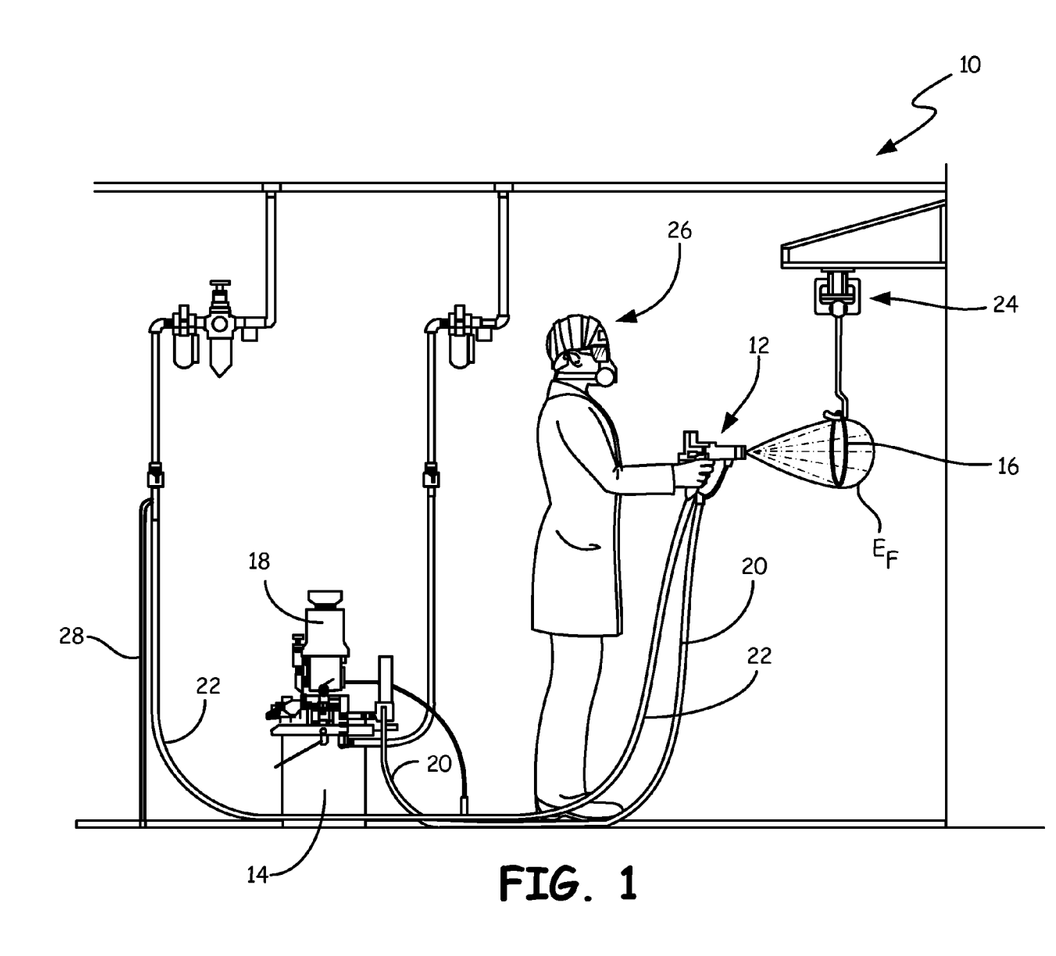
FIG. 1 is a schematic of an electrostatic spray system showing an electrostatic spray gun connected to a fluid supply and discharging onto a target.
Figure 2:
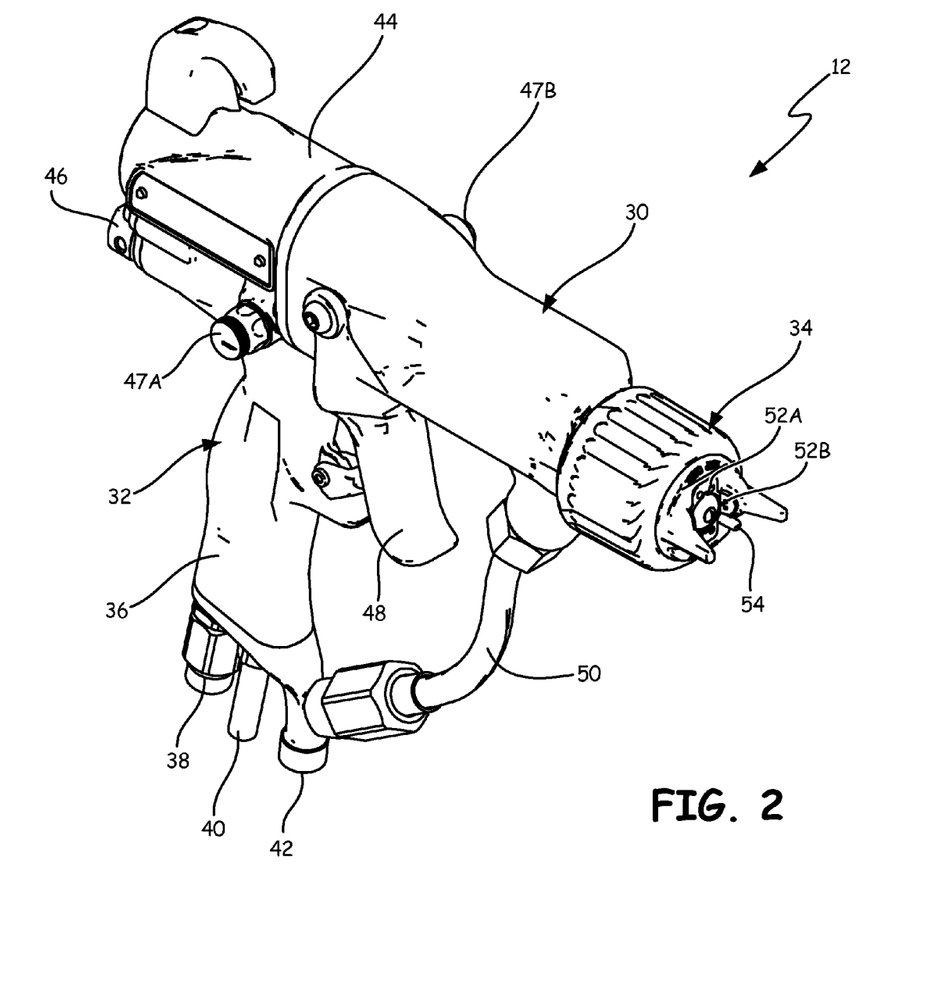
FIG. 2 is a perspective view of the electrostatic spray gun of FIG. 1 showing a gun barrel connected to a handle body and a spray tip assembly.
Figure 3:
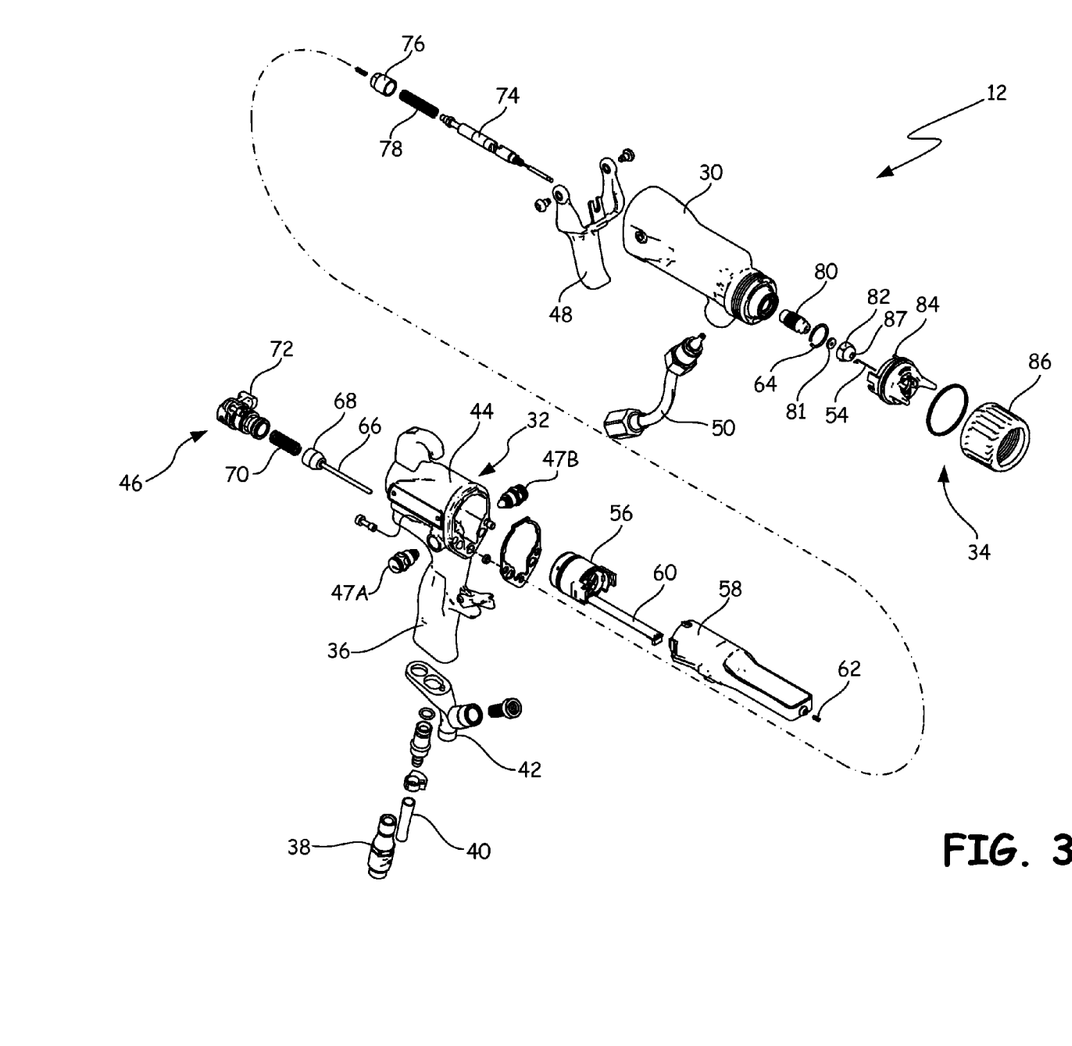
FIG. 3 is an exploded view of the electrostatic spray gun of FIG. 2 showing an alternator and a power supply configured to be located within the gun body.

In embodiments of the present invention, an electrostatic spray gun includes an alternator assembly having a support sheath positioned between an outer housing and an electromagnetic alternator. The electrostatic spray gun generates an internal power using an air-driven turbine that drives a rotor within a stator of the electromagnetic alternator. The stator is surrounded by the support sheath and held in place within the outer housing. The sheath also supports bearings that support a shaft of the rotor. FIGS. 1-3 of the present disclosure describe an electrostatic spray gun in which a support sheath may be used. FIGS. 4A-5B describe various aspects, embodiments and benefits of the support sheath.

FIG. 1 is a schematic of electrostatic spray system 10 showing electrostatic spray gun 12 connected to fluid supply 14 and discharging onto target 16. Pump 18 is coupled to fluid supply 14 and provides pressurized fluid to spray gun 12 via hose 20. Spray gun 12 is also connected to a source of pressurized air (not shown) via hose 22. Target 16 is connected to ground, such as by being suspended from rack 24. Electrostatic spray system 10 is described with reference to a fluid spraying system, but other coating materials may be used with the present invention, such as powders and the like. Although FIGS. 1-3 are described with specific reference to an air-assist system, the present invention may also be used with an air-spray system.

Operator 26 positions spray gun 12 in close proximity to target 16, approximately 0.5 meters or less. Upon actuation of a trigger on spray gun 12, pressurized air is supplied to a turbine within spray gun 12 that powers an alternator to generate electrical power. The electrical power is supplied to an electrode near the spray tip of spray gun 12. Thus, electrical field EF is produced between the electrode and target 16. Electrostatic spray system 10 is grounded at various points. For example, ground wire 28 and/or conductive air hose 22 may ground spray gun 12. Other grounding wires and conductive materials may be used throughout electrostatic spray system 10 to provide grounding. Simultaneously, actuation of the trigger allows pressurized fluid from pump 18 through the spray tip whereby atomized particles of the fluid become charged in electrical field EF. The charged particles are thus drawn to target 16, which is grounded. Target 16 is suspended via rack 24 and the electrically charged fluid particles wrap around target 16, thereby significantly reducing overspray.

FIG. 2 is a perspective view of electrostatic spray gun 12 of FIG. 1 showing gun barrel 30 connected to handle body 32 and spray tip assembly 34. Handle 36 of handle body 32 is connected to air inlet 38, air exhaust 40 and fluid inlet 42. Housing 44 of handle body 32 is connected to gun barrel 30. Air control 46 is connected to an on/off valve (see air needle 66 in FIG. 3) within housing 44 and controls flow of compressed air from air inlet 38 to the components of spray gun 12. Air adjusters 47A and 47B control the flow of air from the aforementioned on/off valve to spray tip assembly 34. Trigger 48 is connected to a fluid valve (see fluid needle 74 in FIG. 3) within gun barrel 30 and is configured to control flow of pressurized fluid from fluid inlet 42 through spray tip assembly 34 via fluid tube 50. Air control 46 controls the flow of air to the alternator. The air then exits spray gun 12 at exhaust 40.

Actuation of trigger 48 simultaneously allows compressed air and pressurized fluid to spray tip assembly 34. Some of the compressed air is used to influence the flow of fluid from spray tip assembly 34 and thereby exits spray gun 12 at ports 52A and 52B, or other such ports. In air-spray systems, some of the compressed air is also used to directly atomize the fluid as it exits the spray orifice. In both air-spray and air-assist systems, some of the compressed air is also used to rotate an alternator that provides power to electrode 54 and leaves spray gun 12 at exhaust 40. The alternator and an associated power supply for electrode 54 are shown in FIG. 3.

FIG. 3 is an exploded view of electrostatic spray gun 12 of FIG. 2 showing alternator 56 and power supply 58 configured to be located within handle body 32 and gun barrel 30. Alternator 56 is connected to power supply 58 via ribbon cable 60. Alternator 56 couples to power supply 58 and, when assembled, alternator 56 fits into housing 44 and power supply 58 fits into gun barrel 30. Electricity generated by alternator 56 is transmitted to power supply 58. In air-assist systems, an electric circuit, including spring 62 and conductive ring 64, conveys the electric charge from power supply 58 to electrode 54 inside of spray tip assembly 34. Air-spray systems may have other electric circuits connecting the alternator to the electrode.

Air needle 66 and seal 68 comprise an on/off valve for control of compressed air through spray gun 12. Air control valve 46 includes air needle 66 that extends through housing 44 to trigger 48, which can be actuated to move seal 68 and control flow of compressed air from air inlet 38 through passages within handle body 32. Spring 70 biases seal 68 and trigger 48 to a closed position, while knob 72 may be adjusted to manipulate valve 46. With seal 68 opened, air from inlet 38 flows through the passages within handle body 32 to alternator 56 or spray tip assembly 34.

Fluid needle 74 comprises part of a fluid valve for control of pressurized fluid through spray gun 12. Actuation of trigger 48 also directly moves fluid needle 74, which is coupled to trigger 48 via cap 76. Spring 78 is positioned between cap 76 and trigger 48 to bias needle 74 to a closed position. Needle 74 extends through gun barrel 30 to spray tip assembly 34.

Spray tip assembly 34 includes seat housing 80, gasket 81, tip 82, air cap 84 and retainer ring 86. In air-assist systems, fluid needle 74 engages seat housing 80 to control flow of pressurized fluid from fluid tube 50 through to spray tip assembly 34. Gasket 81 seals between seat housing 80 and tip 82. Tip 82 includes spray orifice 87 that discharges pressurized fluid from seat housing 80. Electrode 54 extends from air cap 84. In air-assist systems, high pressure fluid is fed through spray orifice 87, from which electrode 54 is offset. Atomization occurs by passing the high pressure fluid through a small orifice. In air-spray systems, an electrode extends from a spray orifice such that the electrode and spray orifice are concentric. Low pressure fluid passes through a large spray orifice, and is atomized by impinging airflow from air cap 34. In either systems, air cap 84 includes ports, such as ports 52A and 52B (FIG. 2), that receive pressurized air to atomize and shape the flow of fluid from tip 82 based on setting of adjusters 47A and 47B. In other embodiments, gun 12 may operate without either of ports 52A and 52B, or may operate with only one of ports 52A and 52B.

Operation of alternator 56 under force of pressurized air provides electrical energy to power supply 58 that in turn applies a voltage to electrode 54. Electrode 54 generates electrical field EF (FIG. 1) that applies a charge to atomized fluid originating from tip 82. The Corona effect produced by electrical field EF carries the charged fluid particles to the target intended to be coated with the fluid. Retainer ring 86 maintains air cap 84 and tip 82 assembled with gun barrel 30, while seat housing 80 is threaded into gun barrel 30.

Figure 4A:
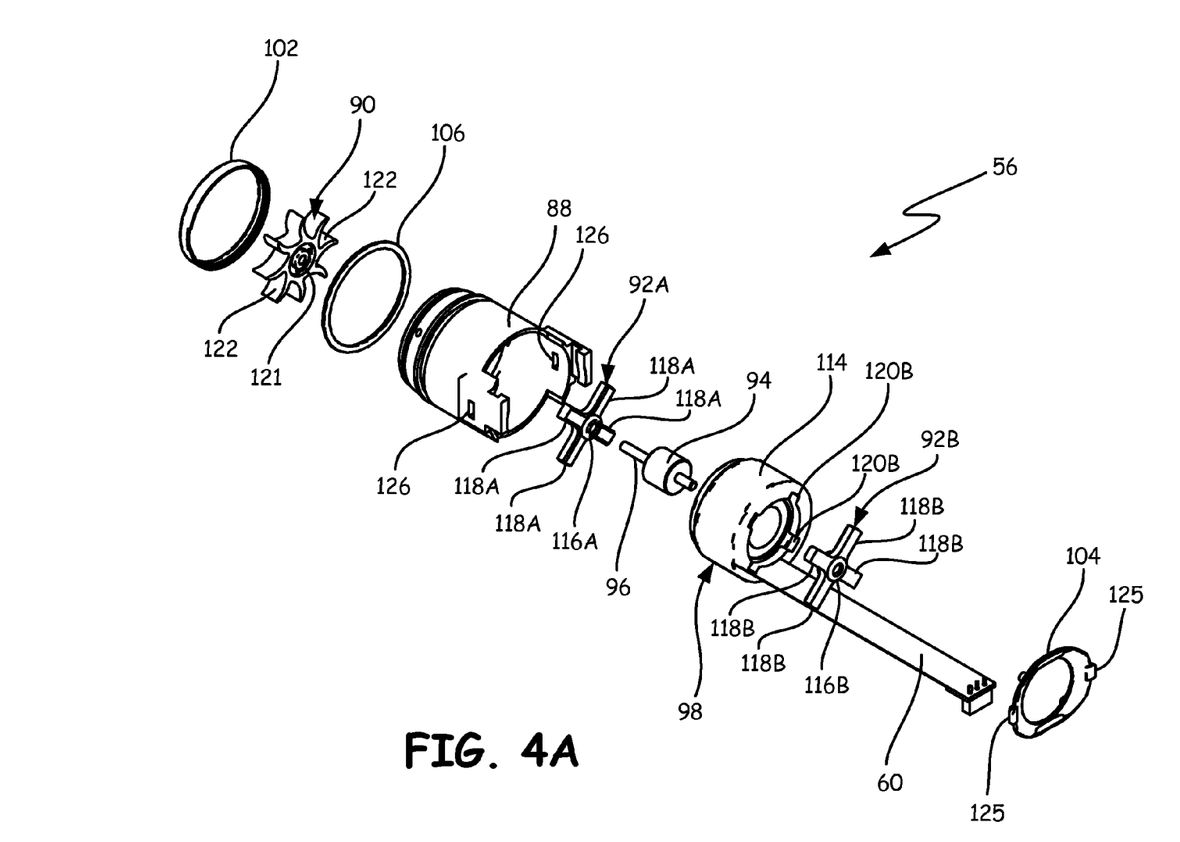
FIG. 4A is an exploded view of the alternator of FIG. 3 showing an impeller and a rotor for mounting within a stator assembly.
Figure 4B:
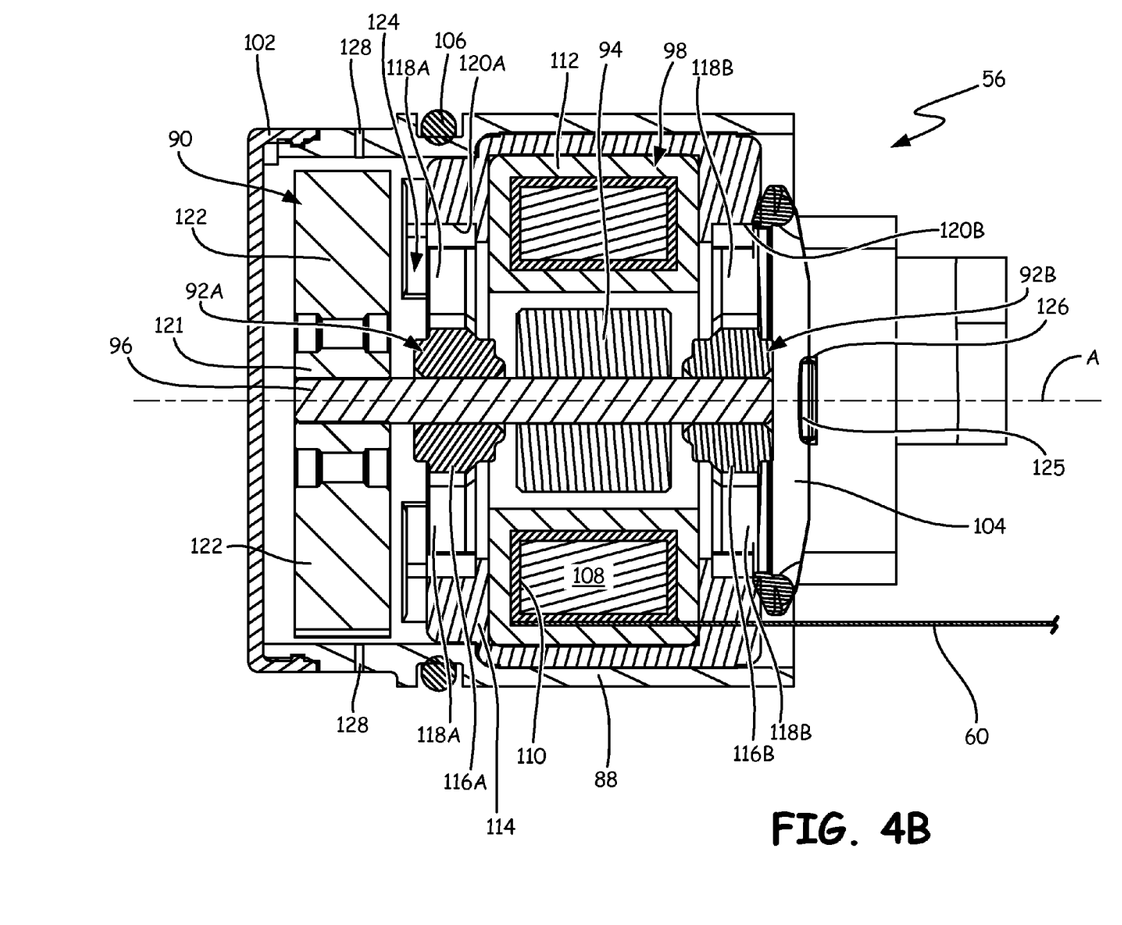
FIG. 4B is a cross-sectional view of the alternator of FIG. 3 showing bearings connecting the rotor to the stator assembly.

FIG. 4A is an exploded view of alternator 56 of FIG. 3 showing an electromagnetic alternator and an impeller. Specifically, alternator 56 includes housing 88, impeller 90, bearing 92A, bearing 92B, rotor 94, shaft 96, stator assembly 98, ribbon cable 60, end cap 102, retention clip 104 and seal 106. FIG. 4B is a cross-sectional view of alternator 56 of FIG. 3 showing stator assembly 98. Stator assembly 98 comprises stator core 108, windings 110, cover 112 and sheath 114. FIGS. 4A and 4B are discussed concurrently.

End cap 102 is connected to housing 88 to form a canister in which components of alternator 56 are disposed. Shaft 96 extends through an inner bore within rotor 94 such that opposite distal ends extend from rotor 94. Bearings 92A and 92B are fitted onto shaft 96 and linked to sheath 114. Specifically, hubs 116A and 116B are fitted over ends of shaft 96 on opposite sides of rotor 94, while prongs 118A and 118B extend to sheath 114. As can be seen in FIG. 4B, prongs 118A and 118B are anchored within pockets 120A and 120B in sheath 114. In one embodiment of the invention, bearings 92A and 92B comprise oil impregnated sintered bronze bearings. In yet other embodiments, bearings 92A and 92B are covered with a solvent-resistant coating, such as a fluoropolymer. Such coatings for bearings are described in U.S. Pat. No. 7,226,004, which is assigned to Graco Minnesota Inc. Impeller 90 is fitted onto shaft 96 proximate bearing 92A. Specifically, hub 121 is inserted over shaft 96, while blades 122 extend generally radially outward from hub 121 toward housing 88.

Impeller 90, rotor 94 and stator assembly 98 are inserted into housing 88. Sheath 114 of stator assembly 98 is tightly fit, or force fit, into housing 88 to securely hold stator assembly 98 within housing 88. Sheath 114 is pushed against shoulder 124 (FIG. 4B) to properly position impeller 90 with respect to openings 128. Inserted as such, impeller 90 is disposed within a space between stator assembly 98 and end cap 102. Shaft 96 is free to rotate within bearings 92A and 92B so that impeller 90 can rotate within housing 88. Retention clip 104 is inserted into housing 88 and tabs 125 (FIG. 4A) engage notches 126 (FIG. 4A) in housing 88. Retention clip 104 prevents bearing 92B from being dislodged from pockets 120B. Retention clip 104 also assists in retaining stator assembly 98 within housing 88 by pushing stator assembly 98 against shoulder 124.

Compressed air is directed into housing 88 through openings 128 in order to induce rotation of impeller 90. The compressed air impacts blades 122 to induce rotation of impeller 90, which causes shaft 96 and rotor 94 to rotate within windings 110 of stator assembly 98. Rotor 94 and windings 110 form an electromagnetic alternator that produces electric current that is provided to ribbon cable 60. In embodiments of the invention, rotor 94 comprises a Neodymium magnet, and windings 110 comprise copper wires. Neodymium magnets have higher energy density than conventional magnets, such as Al-Nico magnets. The higher energy density allows the size and weight of rotor 94 to be reduced. In one embodiment, alternator 56 is reduced in size 40% compared to prior art electrostatic spray gun alternators by the use of Neodymium magnets. The reduced size of rotor 94 lowers the moment of inertia and increases the acceleration of rotor 94 under force of the compressed air, which provides better responsiveness for operator 26 (FIG. 1) and may require less volume of compressed air to operate alternator 56.

Sheath 114 provides a mechanical support structure that connects stator assembly 98 to housing 88, and that supports bearings 92A and 92B, which rotatably support shaft 96. Sheath 114 thus provides a non-rotating anchor or ground for bearings 92A and 92B. As can be seen in FIG. 4B, bearings 92A and 92B are linked to each other via sheath 114. In the disclosed embodiment, sheath 114 circumferentially surrounds the outer diameter of stator assembly 98, particularly the outer diameter of windings 110 (including cover 112), and axially extends from bearing 92A to bearing 92B. Cover 112 comprises, in one embodiment, an epoxy coating of windings 110. In prior art designs, bearings were affixed against the outer alternator housing and could thus be circumferentially rotated at different orientations and could be skewed relative to axis A, which can cause uneven and unnecessary wear of the bearings and shaft. Sheath 114 provides a common reference point in which both bearings 92A and 92B can be anchored. As such, a single manufacturing process can be used to overlay sheath 114 onto stator assembly 98 and simultaneously produce pockets 120A and 120B, thereby facilitating improved alignment of hubs 116A and 116B along axis A.

Figure 5A:
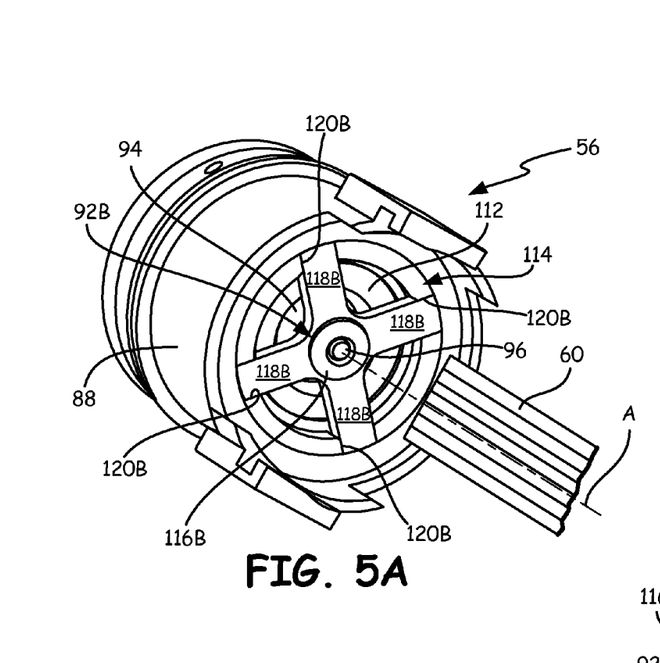
FIG. 5A is a perspective end view of the alternator of FIG. 3 with a retention clip removed to show a bearing recessed into a stator.

FIG. 5A is a perspective end view of alternator 56 of FIG. 3 with retention clip 104 (FIG. 5B) removed to show bearing 92B recessed into sheath 114 of stator assembly 98. In one embodiment, sheath 114 is overmolded around stator assembly 98 to circumscribe windings 110 and cover 112 and form a single, homogeneous piece. Additionally, during the same manufacturing process, pockets 120A (FIG. 3B) and 120B are produced in sheath 114 in order to facilitate alignment of bearings 92A (FIG. 3B) and 92B.

Prongs 118B extend from hub 116B, which surrounds shaft 96, to pockets 120B in sheath 114. In the embodiment shown, bearing 92B includes four prongs 118B. In one embodiment, prongs 118B extend from hub 116B in an X-shape that give support to shaft 96 at ninety degree intervals. The use of multiple prongs 118B provides stability to shaft 96. In particular, pockets 120B allow prongs 118B to be recessed into sheath 114 to immobilize bearing 92B. Furthermore, the use of multiple pockets 120B together ensures that hub 116B with be centered around axis A. Likewise, as shown in FIG. 4B, pockets 120A stabilize bearing 92A with hub 116A centered around axis A. As such, incorporation of pockets 120A and 120B into sheath 114 increase the likelihood that hubs 116A and 116B will be orientated coaxially along axis A.

Pockets 120B additionally allow bearing 92B to be recessed into sheath 114 in order to reduce the overall width of alternator 56. The improved stability of recessing four prongs per bearing into sheath 114 also allows the thickness of each of prongs 118A and 118B to be reduced without sacrificing stability. Thus, the use of a smaller magnet, as provided by Neodymium, and thinner bearing prongs allows the overall length, along axis A, to be reduced as compared to prior art alternators.

Figure 5B:
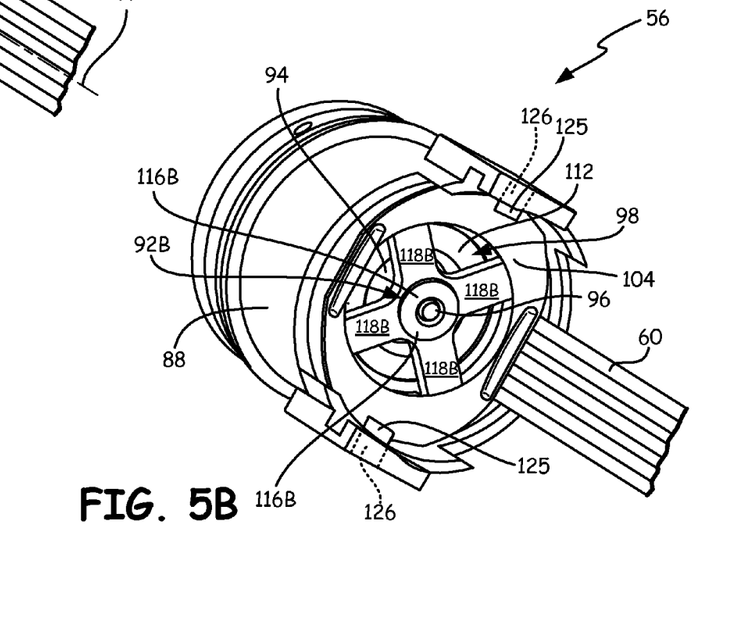
FIG. 5B is a perspective end view of the alternator of FIG. 5A with a retention clip inserted to prevent the bearing from being displaced.

FIG. 5B is a perspective end view of alternator 56 of FIG. 5A with retention clip 104 inserted to prevent bearing 92B from being displaced from housing 88. Retention clip 104 comprises a hoop or ring that has a major axis that extends across the inner diameter of housing 88, with tabs 125 extending clip 104 to a length greater than the inner diameter of housing 88. The diameter of clip 104 is trimmed back at opposing sides to be less than the inner diameter of housing 88 to allow ribbon cable 60 to extend out of housing 88.

Retention clip 104 is made of a thin material that can be deformed, such as plastic or metal. Thus, clip 104 can be deformed to allow tabs 125 into the inner diameter of housing 88 and released to allow tabs 125 to be inserted into notches 126. With tabs 125 inserted into notches 126, clip 104 provides a barrier to bearing 92B that retains prongs 118B within pockets 120B (FIG. 5A). Additionally, clip 104 can be shaped to provide a spring force against bearing 92B. For example, clip 104 can have a bowl shape (FIG. 4B) wherein the inner diameter of the ring extends further into housing 88 than the outer diameter so that the hoop body deforms when tabs 125 are in notches 126. Clip 104 can be easily removed from housing 88 with the use of a tool, such as a screw driver.

A single-piece, over-molded support sheath provides alternator 56 with improved support capabilities. First, sheath 114 provides a pliable body that can be force fit into housing 88, thereby ensuring a stable connection. Second, sheath 114 provides a common anchor point for bearings 92A and 92B, thereby ensuring better alignment. The combined use of a light-weight magnet as well as having improved alignment between bearings 92A and 92B improves the performance and wear life of alternator 56. Specifically, better alignment of bearings 92A and 92B and reduced weight of rotor 94 will reduce vibration of alternator 56, thereby reducing wear on bearings 92A and 92B.

Although the present invention has been described with reference to preferred embodiments, workers skilled in the art will recognize that changes may be made in form and detail without departing from the spirit and scope of the invention.

The invention claimed is:

1. An alternator comprising:
   an alternator housing;
   a stator inserted into the alternator housing and having an inner diameter and an outer diameter;
   a rotor disposed within the inner diameter of the stator;
   a shaft extending from the rotor;
   a first bearing connected to the shaft, wherein the first bearing comprises:
      a first hub having an inner diameter bore in which the shaft is positioned; and a first prong extending from the first hub; and a sheath that surrounds the outer diameter of the stator, supports the stator with respect to the alternator housing, and supports the first bearing, wherein the sheath is located within and surrounded by the alternator housing, and wherein the sheath includes a first pocket to receive the first prong.

2. The alternator of claim 1 and further comprising:

a plurality of first prongs extending from the first hub into a plurality of first pockets in the sheath.

3. The alternator of claim 2 wherein the first prongs extend from the first hub to form an x-shaped body.

4. The alternator of claim 1 and further comprising:

a second bearing connected to the shaft and anchored in the sheath, the first bearing and the second bearing being located on opposite sides of the rotor wherein the second bearing comprises:

a second hub having an inner diameter bore in which the shaft is positioned; and a second prong extending from the second hub;

wherein the sheath includes a second pocket to receive the second prong.

5. The alternator of claim 4 wherein the first pocket circumferentially aligns with the second pocket.

6. The alternator of claim 1 wherein:

the stator comprises a coil assembly; and the rotor comprises a Neodymium magnet.

7. The alternator of claim 1 wherein the stator comprises:

a core;

windings wrapped around the core; and a cover encapsulating the windings and core.

8. The alternator of claim 1 wherein the sheath is plastic.

9. The alternator of claim 1 and further comprising:

a solvent-resistant coating on the bearing.

10. The alternator of claim 1 and further comprising:

an impeller mounted to the shaft.

11. The alternator of claim 1 and further comprising:

a power supply coupled to the coil assembly; and an electrode electrically coupled to the power supply.

12. An electrostatic spray gun comprising:

a housing having a fluid inlet;

a spray tip assembly;

a valve disposed fluidly between the fluid inlet and the spray tip assembly;

the alternator of claim 1;

a power supply coupled to receive electric energy from the alternator; and an electrode electrically coupled to the power supply proximate the spray tip assembly.

13. The electrostatic spray gun of claim 12 wherein the sheath comprises a plastic material that is over-molded onto the alternator.

14. The electrostatic spray gun of claim 12 and further comprising:

a Neodymium magnet comprising a rotor in the alternator; and an impeller mounted to the shaft.

15. The electrostatic spray gun of claim 12 wherein the alternator includes a stator comprising:

a core;

windings wrapped around the core; and a cover encapsulating the windings and core.

16. The electrostatic spray gun of claim 12 and further comprising:

a housing surrounding the sheath; and a retention clip engaged with the housing to prevent dislodgement of one of the first bearings from one of the first pockets.

17. An alternator comprising:

an alternator housing;

a stator inserted into the alternator housing and having an inner diameter and an outer diameter;

a rotor disposed within the inner diameter of the stator;

a shaft extending from the rotor;

a first bearing connected to the shaft;

a sheath that surrounds the outer diameter of the stator, supports the stator with respect to the alternator housing, and supports the first bearing;

a housing surrounding the sheath; and a retention clip engaged with the housing adjacent the first bearing to prevent dislodgement of the first bearing from the sheath.

* * * * *